C. E. LOZIER.
BEARING LUBRICATOR.
APPLICATION FILED MAY 16, 1917.
1,271,737.
Patented July 9, 1918.
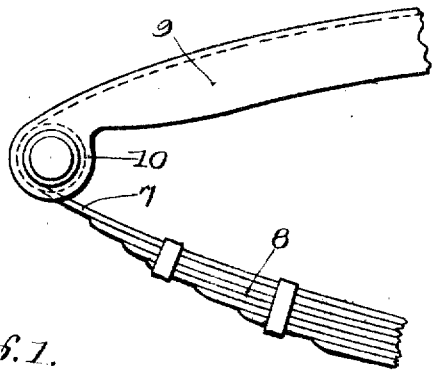
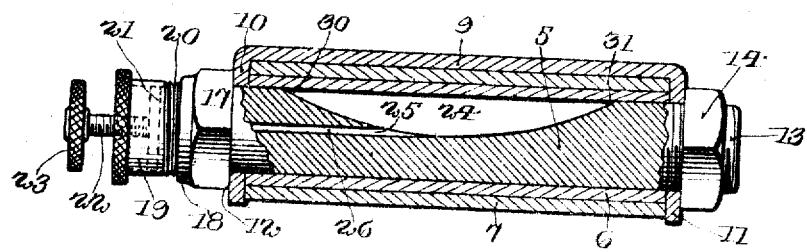

UNITED STATES PATENT OFFICE.

CHARLES E. LOZIER, OF ELYRIA, OHIO.

BEARING-LUBRICATOR.

1,271,737.　　　Specification of Letters Patent.　　Patented July 9, 1918.

Application filed May 16, 1917. Serial No. 168,942.

*To all whom it may concern:*

Be it known that I, CHARLES E. LOZIER, a citizen of the United States, residing at Elyria, in the county of Lorain and State of Ohio, have invented certain new and useful Improvements in Bearing-Lubricators; and I do hereby declare the following to be a full, clear, and exact description of the invention, such as will enable others skilled in the art to which it appertains to make and use the same.

My invention relates to apparatus for lubricating machine bearings, such, for example, as are used adjacent shackle bolts employed where the semi-elliptical spring joins the frame member of an automobile.

In general, I aim to improve the means for lubricating machine bearings by providing apparatus more convenient and cheaper to produce, more efficient, more convenient and easier to operate, and in which the grease can be readily and conveniently loosened by cheap, simple devices, should such grease become clogged in the ways.

Other objects, uses and advantages of my invention, as well as the invention itself, will be better understood from a description of an embodiment thereof.

Figure 1 is a view partly in section and partly in elevation of apparatus incorporating one embodiment of my invention.

Fig. 2 is a section through a shackle bolt showing the embodiment illustrated in Fig. 1.

Fig. 3 is a section through the embodiment illustrated in Fig. 1, including parts of the semi-elliptical spring and frame member of an automobile.

Fig. 4 is a perspective view of a shackle bolt illustrated in Figs. 1, 2 and 3.

Fig. 5 shows portions of the frame of an automobile and a semi-elliptical spring thereof to show one use of my invention.

Referring now to the drawings and the embodiment of my invention illustrated therein, at 5 is shown a shackle bolt passing through a sleeve 6, which is rigidly connected by any convenient means (not shown) to the principal leaf 7 of the spring 8. The frame member 9 is forked at the end as illustrated best in Figs. 3 and 5. The prongs 10 and 11 of the fork are perforated and the shackle bolt passes therethrough. The fork 10 engages a shoulder 12 on the bolt. The other end of the bolt is threaded, as shown at 13, where a nut 14 is applied to cause a close engagement between the bolt and frame member, so the bolt will oscillate with the frame member.

The end of the bolt is recessed, as shown at 15. The inner side of the walls 18 of the recess are threaded, as shown at 16 and the outside is provided with wrench engageable surfaces, as shown at 17. A grease cup 19, provided with threads 20, to coöperate with the threads 16, is mounted on one end of the bolt, as shown in Fig. 1. A grease driving plunger 21 is mounted in the cup upon a shaft 22 threaded through an opening in the top of the cup 19. A knurled head 23 is employed for driving the plunger. Obviously, any other suitable grease cup and grease driving means may be employed.

A curved slot is formed in the shackle bolt running parallel to the long axis of the bolt and preferably for substantially the entire length of the bearing surface thereof. In the embodiment shown, this slot is shaped transversely like the segment of a circle, having been cut in the bolt by a circular milling tool. In this manner the slots can be quickly, conveniently and cheaply formed by standard machinery. Moreover, the walls are so inclined as to afford an easy path for the flow of grease in each direction and to the ends 30 and 31 of the slot and intermediate portions from the entrance orifice 25. The orifice 25 is placed intermediate the ends of the slot and preferably to one side of the center thereof, so that the grease may be fed in both directions, thereby reducing the possibility of its packing in the slot.

I provide a bore or channel 26 for the passage of grease from the cup to the orifice 25. This channel should be made straight to facilitate the passage of grease to the bearing and to the better permit the use of some simple device, such as a wire 27, to loosen and dislodge the lubricating material, should it pack in the slot 24. The slot is best made uniform in width, as illustrated in Fig. 3.

In operation the head 23 is rotated, screwing the plunger 21 into the cup 19 and driving the grease through the bore 26 and the orifice 25 into the slot 24, where it flows in each direction along the curved bottom walls of the slot with great ease to the bearing, and in a thin layer between the bolt 5 and the sleeve 6. When, as illustrated, the orifice 25 is near the center of the bottom of the slot, the lubricant will be fed equally in all directions and there will be little or no tendency of the grease to pack at all. Owing to the more rapid movement of the grease toward the end 31, the orifice 25 should, as illustrated, be placed nearest the end 30, since more of the lubricating material will at first flow at the end 31.

The bore 26 is illustrated as substantially tangent to the bottom wall of the slot 24, which, when formed in the manner described, will be an arc of a circle, so the grease will flow without obstruction along the bottom of the slot. Owing to the tendency of the more grease to flow into the end 31 of the slot, it will there pack first, if through ignorance or carelessness too much grease is applied. It will readily be seen that with my invention it is the end 31 that is most readily and conveniently reached by the grease loosening device 27. It will also be seen that the slot will hold a relatively large amount of lubricating material, which will be easily and readily fed to the bearing, increasing the elasticity of the system.

I have described this particular embodiment of my invention and the mechanical details employed therewith and this particular use to better illustrate and describe my invention. I do not wish to be limited thereto, as obviously many departures may be made therefrom without departing from my invention.

I claim:—

1. In bearing lubricating apparatus, the combination of bearing members, one of which is provided with a slot whose bottom surface is curved on an arc of a circle and a lubricant feeding bore tangent to the bottom of the slot and entering the same adjacent but to one side of the center of the bottom of the slot and intermediate the ends thereof, the bottom of the slot curving in both directions away from the entrance orifice of the bore, and means to cause lubricating material to flow through the bore into the slot.

2. In bearing lubricating apparatus, the combination of bearing members, one of which is provided with a slot having an opening contiguous the other bearing member and a continuously curved bottom, a lubricant conducting bore extending from one end of the slotted bearing member to the slot, said bore being tangent to the bottom of the slot and entering the same adjacent the central portion thereof but nearest the end of the slotted bearing member containing the entrance to said bore, the walls of the slot being curved in either direction from the orifice of the bore and means to cause lubricating material to flow through the bore and into the slot.

3. In bearing lubricating apparatus, the combination of two bearing members, one of which is provided with a straight lubricant conducting bore parallel to the axis of the bearing members and having an entrance at one end of said member and a slot with which said bore communicates adjacent the lowest point in the slot, the bottom of the slot being continuously curved in each direction from the orifice to the mouth of the slot and means to cause lubricating material to flow through the bore into the slot.

4. In bearing lubricating apparatus, the combination of a bearing member provided with an open radial slot having a bottom uniformly curved throughout its length and a bore parallel to the long axis of the bearing member and communicating with the slot adjacent the bottom thereof through which lubricating material is forced into the slot from the end of the slotted member.

5. In bearing lubricating apparatus, the combination of a cylindrical bearing member provided with a segment-shaped slot cut radially therein, the chord edge of the slot cut being on the periphery of the cylindrical bearing member and the arc wall of the slot constituting the bottom thereof, a sleeve bearing member over said cylindrical member having an opening therein, said cylindrical member being provided with an axial bore communicating at one end with said segmental slot at the bottom thereof and through the opening in the cylindrical member at the other end with the exterior of the apparatus, whereby grease may be introduced to the slot through the bore without removing the sleeve member from the cylindrical member.

6. In bearing lubricating apparatus, the combination of a cylindrical bearing member provided with a segment-shaped slot cut radially therein, said slot being parallel to the cylindrical walls of said cylindrical bearing member and extending radially therein to or about to the long central axis of said member, the chord edge of the slot being on the periphery of the cylindrical bearing member and extending therealong for substantially the entire length of the bearing surface thereof, a sleeve bearing member about the cylindrical member, said cylindrical member being provided with a bore parallel with the long principal axis of said bearing members and communicating at one end with said slot at a point adjacent the bottom of the deepest part thereof, said bore communicating at the other end with the exterior of the apparatus, whereby grease may be introduced to the slot through the bore without removing the sleeve member from the cylindrical member.

In witness whereof, I have signed my name hereunto this 7th day of May, 1917.

CHARLES E. LOZIER.